(12) United States Patent
Kondorf

(10) Patent No.: US 11,071,267 B2
(45) Date of Patent: Jul. 27, 2021

(54) ENVIRONMENT-ENHANCING HYDROPONIC GARDEN SYSTEM HAVING INSTREAM AERATION FEATURES

(71) Applicant: Peter A. Kondorf, Brighton, CO (US)

(72) Inventor: Peter A. Kondorf, Brighton, CO (US)

( * ) Notice: Subject to any disclaimer, the term of this patent is extended or adjusted under 35 U.S.C. 154(b) by 233 days.

(21) Appl. No.: 16/366,884

(22) Filed: Mar. 27, 2019

(65) Prior Publication Data

US 2020/0305372 A1 Oct. 1, 2020

(51) Int. Cl.
| | | |
|---|---|---|
| *A01G 31/06* | (2006.01) | |
| *A01G 9/02* | (2018.01) | |
| *A01G 27/02* | (2006.01) | |
| *A01G 31/00* | (2018.01) | |

(52) U.S. Cl.
CPC ............. *A01G 31/06* (2013.01); *A01G 9/022* (2013.01); *A01G 27/02* (2013.01); *A01G 2031/006* (2013.01)

(58) Field of Classification Search
CPC .. A01G 31/06; A01G 2031/006; A01G 9/022; A01G 27/02
See application file for complete search history.

(56) References Cited

U.S. PATENT DOCUMENTS

| | | |
|---|---|---|
| 2,928,211 A | 3/1960 | Martin |
| 4,035,950 A | 7/1977 | Anselm |
| 4,608,776 A * | 9/1986 | Kooy ................ A01G 5/06 312/116 |
| 5,097,627 A | 3/1992 | Roberts |
| 5,167,368 A | 12/1992 | Nash |
| 5,555,676 A | 9/1996 | Lund |
| 5,826,375 A | 10/1998 | Black |
| 6,634,138 B2 | 10/2003 | Katzman |
| 7,536,827 B2 | 5/2009 | Busch et al. |
| 8,181,391 B1 | 5/2012 | Giacomantonio |

(Continued)

FOREIGN PATENT DOCUMENTS

| | | | |
|---|---|---|---|
| GB | 2534407 A * | 7/2016 | ............. A47G 7/041 |
| JP | 2004073003 A | 3/2004 | |

(Continued)

*Primary Examiner* — Joshua D Huson
*Assistant Examiner* — Abigail L Rydberg
(74) *Attorney, Agent, or Firm* — Dorsey & Whitney LLP

(57) ABSTRACT

Described herein are example portable indoor hydroponic garden assemblies and associated methods of use. The portable indoor hydroponic garden assemblies can include features that facilitate hydroponic gardening in an indoor environment, including structural features that enhance the indoor environment itself, such as through sounds, smells, textures, sights, and so on. In an example, the portable indoor hydroponic garden system includes a tiered growing assembly housed fully within an enclosure. The tiered growing assembly can include a group of trays defining tiers that are recessed from one another, allowing water or other fluid to flow from tray to tray, creating waterfall features there between that can aerate the water and emit a pleasurable sound to the indoor environment. The enclosure can be climate controlled and thus adaptable to a variety of indoor conditions to grow desired plants, including embodiments using programmable heating and lighting systems.

18 Claims, 9 Drawing Sheets

(56) References Cited

U.S. PATENT DOCUMENTS

| | | | |
|---|---|---|---|
| 8,578,651 B1* | 11/2013 | Giacomantonio | A01G 31/02 47/62 A |
| 9,125,349 B2 | 9/2015 | Leavitt | |
| 2009/0000189 A1 | 1/2009 | Black | |
| 2011/0296757 A1 | 12/2011 | Mcgrath | |
| 2014/0090295 A1* | 4/2014 | Fambro | A01G 9/1423 47/62 N |
| 2016/0113222 A1 | 4/2016 | Hori et al. | |
| 2017/0105372 A1* | 4/2017 | Bryan, III | A01G 9/023 |
| 2017/0172084 A1 | 6/2017 | Fox et al. | |
| 2019/0110417 A1* | 4/2019 | Zeng | A01G 7/045 |
| 2019/0335679 A1* | 11/2019 | Li | A01G 9/021 |

FOREIGN PATENT DOCUMENTS

| | | |
|---|---|---|
| JP | 6249153 B2 | 12/2017 |
| KR | 101176761 B1 | 8/2012 |
| WO | 2012167615 A1 | 12/2012 |

* cited by examiner

ENVIRONMENT-ENHANCING HYDROPONIC GARDEN SYSTEM HAVING INSTREAM AERATION FEATURES

FIELD

The described embodiments relate generally to enhancing indoor environments through gardening, and more particularly to systems and techniques for enhancing indoor environments with hydroponic systems.

BACKGROUND

Hydroponics can be used to grow and sustain hydroponically grown plants. Sample plants include certain herbs and vegetables, including flowering and non-flowering varieties. Plants are generally arranged with at least some of their root system continually submerged within water or other hydroponic fluid. The water can be arranged to flow through the root system, often in a continuous fashion, proving renewed, recirculated flow to facilitate plant growth and nourishment.

Traditional arrangements can deplete nutrients and characteristics from the water that support growth, including depleting oxygen levels within the water. This can limit plant growth, including limiting the type and variety of plants capable of growing in a hydroponic system. Many traditional hydroponic arrangements also fail to account for the unique challenges of implementing hydroponics in an indoor environment, including failing to account for mess, lighting, sound, materials, and so forth. Traditional systems thus suffer from significant drawbacks that can limit the adaptability of hydroponics to indoor settings. As such, the need continues for systems and techniques that facilitate hydroponic system implementation, including in settings not inherently conducive to plant growth.

SUMMARY

Embodiments of the present invention are directed to a portable indoor hydroponic garden system. The portable indoor hydroponic garden system can be used to grow and support hydroponically-grown plants in an indoor environment. The portable indoor hydroponic garden system can implement a variety of features, structures, components, and so on that can facilitate hydroponic gardening within an indoor environment, including features directed to water supply (or other hydroponic fluid) replenishment, environmental control (for the hydroponic plants), and environment-enhancement (for the indoor environment itself). The portable indoor hydroponic garden system therefore not only includes specific and illustrative features tailored to grow hydroponic-type plant indoors, the portable indoor hydroponic garden system implements such features in a manner that can actively enhance the indoor environment within which the portable indoor hydroponic garden system is placed, including enhancing via sounds, smells, textures, sights, and so forth.

While many embodiments are described and contemplated herein, in an embodiment, a portable indoor hydroponic garden system is disclosed. The portable indoor hydroponic garden system includes an enclosure having an interior volume and an opening extending into the interior volume. The interior volume defines a climate-controlled zone arranged at the opening and configured to regulate light, temperature, or humidity therein. The portable indoor hydroponic garden system further includes a tiered growing assembly housed fully within the enclosure.

The tiered growing assembly includes a first tray for containing hydroponically-grown plants arranged at an upper portion of the climate-controlled zone and defining a first plant-growing segment of a hydroponic flow path. The tiered growing assembly further includes a waterfall feature extending from the first tray and defining an aeration segment of the hydroponic flow path that cascades from the first segment. The tiered growing assembly further includes a second tray for containing hydroponically-grown plants arranged elevationally below the first tray and closer to the opening than the first tray. The second tray defines a second plant-growing segment and the hydroponic flow path that receives cascading flow from the aeration segment. The first plant-growing segment, the aeration segment, and the second plant-growing segment are consecutive sequential segments of the hydroponic flow path.

The portable indoor hydroponic garden system further includes a hydroponic fluid circulation system housed fully within the enclosure and configured to cause hydroponic fluid circulation along the hydroponic flow path. The waterfall feature is configured to emit a sound when hydroponic fluid flows along the aeration segment of the hydroponic flow path. The opening is configured to frame the tiered growing assembly, thereby permitting release of the sound to an ambient environment and viewing of the first plant-growing segment, the aeration segment, and the second plant growing segment of the hydroponic flow path from the ambient environment. The tiered growing assembly is further configured to visually obscure the hydroponic fluid circulation system.

In another embodiment, the waterfall feature is a first waterfall feature and the aeration segment is a first aeration segment. The tiered growing assembly can further include a second waterfall feature extending from the second tray and defining a second aeration segment of the hydroponic flow path that cascades from the second segment. The tiered growing assembly can further include a third tray for containing hydroponically-grown plants and arranged elevationally below the second tray and closer to the opening than the second tray, the third tray defining a third plant-growing segment of the hydroponic flow path that receives cascading flow from the second aeration segment. The first plant-growing segment, the first aeration segment, the second plant-growing segment, the second aeration segment, and the third plant-growing segment can be consecutive sequential segments of the hydroponic flow path.

In another embodiment, flow of hydroponic fluid from the first plant-growing segment, to the first aeration segment, to the second plant-growing segment, to the second aeration segment, and to the third plant-growing segment is a gravity-based flow. In this regard, the hydroponic fluid circulation system can further include a reservoir arranged at a lower portion of the enclosure and separated from the opening by the tiered growing assembly. The reservoir can be configured to hold a quantity of the hydroponic fluid for circulation along the hydroponic flow path. The hydroponic fluid circulation system can further include a pump configured to draw the hydroponic fluid held within the reservoir to the first plant-growing segment of the hydroponic flow path. The hydroponic fluid circulation system can further include a catch configured to route the hydroponic fluid from the third plant-growing segment to the reservoir.

In another embodiment, the enclosure includes a viewing window arranged at the lower portion and adjacent the reservoir. The viewing window can be configured to convey information associated with the hydroponic fluid held within the reservoir, including a fill level and fluid quality. The hydroponic fluid circulation system can further include a drain subsystem. The drain subsystem can be configured to use the pump for exit of the hydroponic fluid to an exterior receptacle.

In another embodiment, the portable indoor hydroponic garden system can further include a lighting system housed fully within the enclosure and configured to optically enhance the climate-controlled zone with respect to a viewing position outside the enclosure and optically aligned with the opening. In this regard, a portion of the lighting system can be visually obscured from the ambient environment by one or more walls of the enclosure.

In certain embodiments, the portable indoor hydroponic garden system can further include a group of wheels. The group of wheels can support the enclosure within the exterior environment and allow for movement of the enclosure from a first location to a second location. Additionally or alternatively, the enclosure is configured for placement on a tabletop, counter, or shelf.

In another embodiment, the portable indoor hydroponic garden system can further include an air circulation system housed fully within the enclosure and configured to remove heat from the climate-controlled zone through the opening, one or more of the pump, the lighting system, or a fan controllable by a timer arranged along a side of the enclosure.

In another embodiment, the enclosure can be formed from a wood material. In some cases, the enclosure can define a parallelepiped. As such, the opening of the enclosure can be defined through a face of the parallelepiped such that a border of the enclosure obscures electromechanical components of the system from view through the opening.

In another embodiment, one or both of the first tray or the second tray can include panels forming a trough. The trough can define the respective one of the first or second plant-growing segments. Additionally, the panels can be formed from a plastic material and joined to one another at waterproof interfaces, thereby forming the trough. In certain embodiments, the portable indoor hydroponic garden system further includes a reinforcement layer connected to adjacent panels forming the trough along the waterproof interface. The reinforcement layer can be positioned outside of the respective one of the first or second plant-growing segments.

In another embodiment, the waterfall feature comprises an angled panel connected to an outlet of the trough defining the first plant-growing segment. The angled panel can have a free end positioned above an inlet of the trough defining the second plant growing segment. Additionally, the portable indoor hydroponic garden system can further include a barrier insert positionable within the trough. The barrier insert can span a width of the trough along a bottommost portion of the hydroponic flow path of the respective one of the first or second plant growing segments. Further, the portable indoor hydroponic garden system can include a cover having a series of openings configured to receive plants for hydroponic growth.

In another embodiment, the portable indoor hydroponic garden system further includes the hydroponic fluid. The hydroponic fluid can be a blend of water and hydroponic nutrients. The portable indoor hydroponic garden system can further include a group of hydroponically-grown plants.

In another embodiment, a method for operating a portable indoor hydroponic garden system is disclosed. The method includes providing the portable indoor hydroponic garden system, such as any of the portable indoor hydroponic gardens described herein. The method further includes arranging a group of hydroponically-grown plants in a first or a second tray of a tiered growing assembly. The method further includes flowing hydroponic solution along the hydroponic flow path using the hydroponic fluid circulation system, thereby emitting the sound from the waterfall feature to the ambient environment through the opening.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
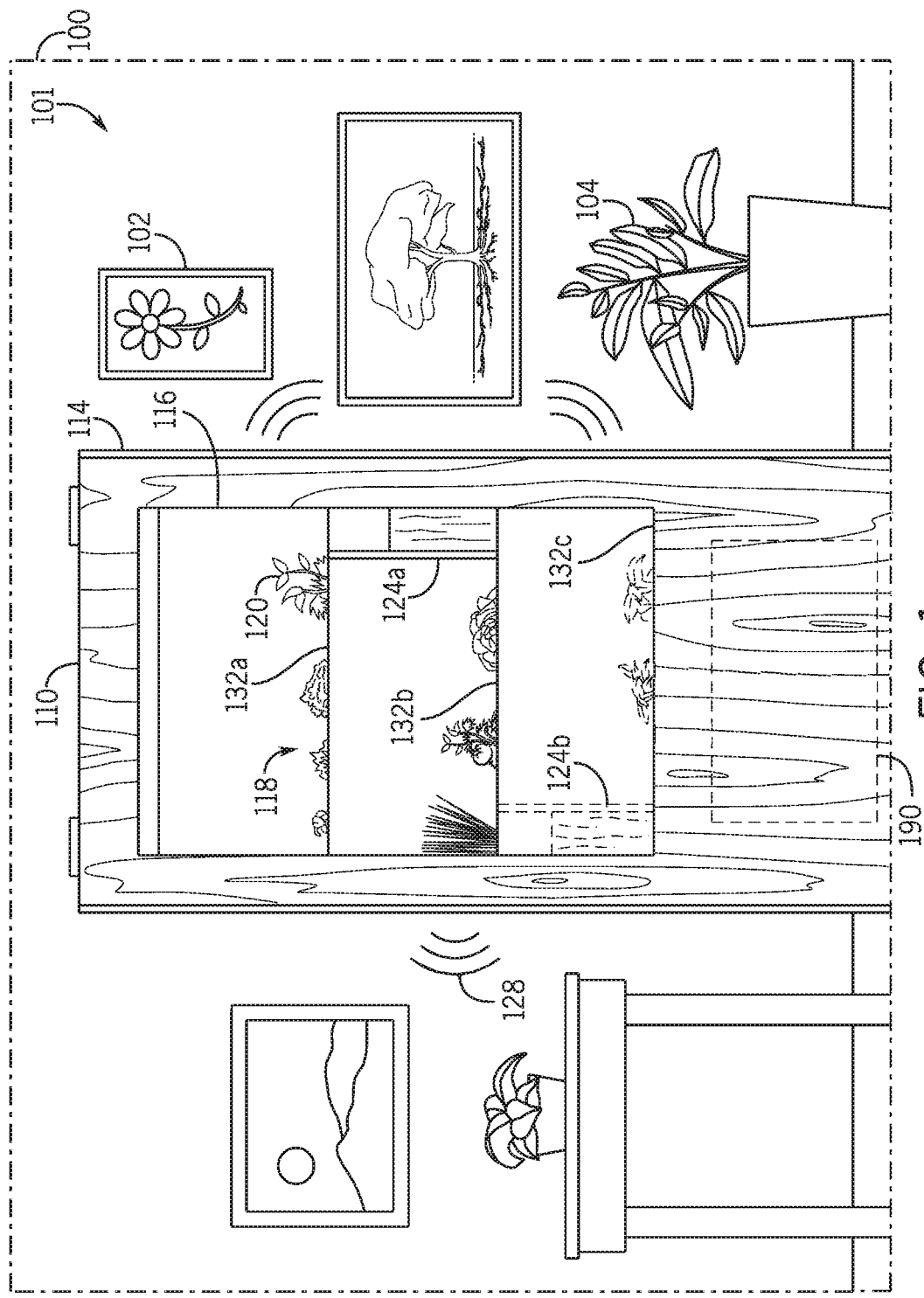
FIG. 1 depicts a sample hydroponic garden system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to hydroponic gardens. The hydroponic garden can be a portable indoor hydroponic garden system, as described herein. Hydroponic gardens, systems, assemblies, and so on can typically grow and sustain a variety of plants by submerging a portion of the plant in a circulated stream of water. Plants can include, but are not limited to, certain herbs, vegetables, or flowering plants as described herein. A circulated stream of water can provide nutrients to plants that are partially submerged therein, nutrients that can be different in character than that provided by soil, creating a dynamic and potentially unpredictable growing environment. However, the circulated stream of water often creates undue mess, including leaks, and is hidden from view from an observer. The stream can grow stagnant, deplete of nutrients, hindering the grow-enhancing properties from which the submerged plant initially benefited.

The portable indoor hydroponic garden system of the present disclosure can mitigate such hindrances, thereby allowing for targeted indoor growing of hydroponic plants in a manner that can enhance both plant growth and the indoor environment itself. The portable indoor hydroponic garden system thus provides an adaptable and integrated approach that can be used to grow various types of hydroponic plants and be tuned to particular indoor environments. In one example, the portable indoor hydroponic garden system includes a tiered growing assembly housed fully within an enclosure. The enclosure can be substantially climate controlled, including controlling temperature and light therein, while also providing an opening or viewing window to observe the tiered growing assembly. The tiered growing assembly can include a group of trays, each arranged on a tier and recessed from one another. Water can flow along and between the trays to define a hydroponic flow path and a waterfall feature therebetween. The waterfall feature can aerate fluid along the hydroponic flow path. The waterfall feature can also be tuned to provide environment-enhancing sounds to the indoor environment. The assembly can thus provide any of a variety of needed growing environments for the hydroponic plants, while also emitting or exhibiting various sounds, sights, smells, and textures that enhance the indoor environment.

While the tiered growing assembly can take many forms, in one embodiment, the tiered growing assembly includes a first, second, and third tray. Each tray is arranged to grow hydroponically-grown plants. For example, the tray can define a trough shape that is a channel for fluid flow along the hydroponic flow path. In some cases, this can be constructed from a series of walls, including plastic sheets cut to respective size to form a trough. In other cases, the trough or tray more generally can be a substantially integrally-formed shape, including being formed at least partially from a section of pipe. The tray can also include other components to support hydroponically grown plants, including a cover with holes arranged for holding and maintaining particular plants in a designated location. Other features of the trays can include barrier inserts, arranged with the trough and allowing for flow blockage, build-up, or pooling of the fluid at locations relative to the hydroponic plants.

With any of the configurations of trays contemplated herein, the trays can be arranged in a tiered fashion. For example, a second tray can be below and offset from a first tray, and a third tray can be below and offset from the second tray, and so on. The trays can be separated from one another in a manner so that water or other hydroponic fluid can flow and cascade from one tray to the next, creating a waterfall feature therebetween. The waterfall feature agitates the fluid in a manner that can introduce oxygen or other gasses into the fluid that can facilitate plant growth. The trays can also be arranged so that the waterfall feature produces an environment-enhancing sound. For example, and as described herein, at least a portion of the tray can include an angled panel or other structure that helps guide fluid from one tray to the next. The trays themselves can also have a particular elevation and setback within the tiered growing assembly and relative to one another, tailored to induce a particular sound (or volume of sound) from the waterfall feature when fluid cascades between the trays. The trays can therefore operate collectively to help supply needed nutrient-rich fluid to the plants and emit sounds, characteristic of the soothing sounds emitted by natural waterfalls.

The tiered growing assembly is specifically suited for indoor applications, including providing a climate suitable for hydroponically growing plants indoors and structures and systems for enhancing the indoor environment in which the system is arranged. As an example, the portable indoor hydroponic garden system includes an enclosure that can fully enclose all elements of the portable indoor hydroponic garden system. As such, the tiered growing assembly can be contained within the enclosure in order to mitigate leaks, spills, and other potential fluidic issues to within a confined space, and thus mitigate or avoid undesirable fluid release into the indoor environment. For example, the enclosure can have an interior volume within which the tiered growing assembly is arranged, and one or more openings for viewing the tiered growing assembly. The configuration of the enclosure thus permits optimal release of the sounds and sights of the hydroponically grown plants and associated waterfall features to the indoor environment, while containing fluids therein.

The enclosure in conjunction with the tiered growing assembly can also be equipped to visually obscure electrical and/or mechanical components from view, helping emphasize the sights and sounds of the hydroponically grown plants themselves, rather than the equipment supporting their growth. In one embodiment, the portable indoor hydroponic garden system includes a hydroponic fluid circulation system housed fully within the enclosure which is visually obscured from view by the tiered growing assembly. In this regard, the hydroponic fluid circulation system can route fluid to an uppermost portion of the enclosure, feeding an uppermost one of the trays with fluid. The tiered growing assembly itself can be largely defined by a gravity flow, with fluid moving from one tray to the next and cascading therebetween at the waterfall features. At the lowermost tray, the water can be collected, obscured from view, and pumped and recirculated back to the uppermost tray.

It will be appreciated that various sample pumps, lights, heating elements, switches, and so forth are described herein for purposes of illustration. Such components can operate, collectively or individually, to produce an environment within the enclosure for growing the hydroponic plants. In particular, such components can cooperate to produce an environment within the enclosure specifically tuned for target plants grown by the portable indoor hydroponic garden system. In some cases, this can also include tuning the environment within the enclosure to produce certain sounds, sights, smells, and so forth and emit such into the indoor environment within which the enclosure is arranged. In this regard, while such components are described herein, in certain other embodiments other components can be used in other configurations to appropriately tune the portable indoor hydroponic garden system.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts a portable indoor hydroponic garden system 110, such as the portable indoor hydroponic garden assemblies discussed above and described in greater detail below. The portable indoor hydroponic garden system 110 can be arranged to grow hydroponic plants in an indoor environment 100, such as hydroponic plants 120 shown in FIG. 1. The hydroponic plants 120 can include any of a variety of appropriately grown hydroponic plants, including flowering and non-flowering plants. The hydroponic plants 120 can also include certain vegetables, such as, by non-limiting example, artichokes, beans, lettuce, spinach, beets, asparagus, broccoli, cauliflower, and peas. The hydroponic plants 120 can also include certain herbs, such as, by non-limiting example, anise, basil, catnip, chamomile, chervil, chives, cilantro, coriander, dill, lavender, marjoram, mint, oregano, rosemary, sage, and thyme. In other cases, other hydroponically grown plants can be grown using the portable indoor hydroponic garden system 110.

The portable indoor hydroponic garden system 110 can be specifically configured to grow the hydroponic plants in the indoor environment 100. For example, and as shown in FIG. 1, the portable indoor hydroponic garden system 110 can include an enclosure 114 and a tiered growing assembly 118 housed fully within the enclosure 110. As described in greater detail below, the tiered growing assembly 118 can be adapted to grow the hydroponic plants 120 using one or more trays, each arranged in a tiered fashion, being offset from one another and positioned at different elevations. For purposes of illustration, FIG. 1 shows the tiered growing assembly 118 as having a first tray 132a, a second tray 132b, and a third tray 132c.

Water or other hydroponic fluid, such as water infused with nutrient additives, can be caused to flow through the tiered growing assembly 118. For example, water can be caused to flow from the first tray 132a, to the second tray 132b, to the third tray 132c, defining a hydroponic flow path for recirculating water through the respective trays and supporting growth of the plants. The trays 132a, 132b, 132c are arranged at elevationally different positions and offset from one another, thus allowing water along the fluid path to form a waterfall feature between each tray. For example, water may cascade between respective ones of the trays and form a waterfall feature, such as the first waterfall feature 124a and the second waterfall feature 124b shown in FIG. 1. The waterfall features 124a, 124b can agitate fluid flowing along the hydroponic flow path. This can help aerate the fluid, adding oxygen and other helpful gasses to the flow that supports hydroponic plant growth.

It will be appreciated that the tiered growing assembly 118 can include any appropriate number of trays. In the embodiment of FIG. 1, three trays (e.g., trays 132a, 132b, 132c) are illustrated, with two interposed waterfall features (e.g., water fall features 124a, 124b). The waterfall feature 124b and a portion of the tray 132c are shown in phantom, indicating that in some embodiments, the waterfall feature 124b and the tray 132c are optional. For example, the tiered growing assembly 118 can include two trays and a single waterfall feature therebetween. In other cases, the tiered growing assembly 118 can include the three trays shown in FIG. 1, with the two interposed water fall features. In yet other cases, the tiered growing assembly 118 can include four, five, six, or more such trays, with interposed waterfall features therebetween. As such, while the embodiment of the tiered growing assembly 118 can be described with respect to having two or three trays, this is meant as illustrative only.

As described herein, the portable indoor hydroponic garden system 110 can enhance characteristics of the indoor environment 100. For example, the indoor environment 100 can define an ambient environment 101, within which the portable indoor hydroponic garden system 110 is arranged. The portable indoor hydroponic garden system 110 can enhance the ambient environment 101 by various techniques, including by emitting certain sounds and sights into the ambient environment 101. As one example, FIG. 1 shows the portable indoor hydroponic garden system 110 emitting sounds 128 into the ambient environment 101. The sounds 128 can be induced by the flow of one or more of the waterfall features described herein. For example, the sounds 128 can correspond to that induced by the cascade of water from the first and/or second waterfall feature 124a, 124b. In this regard, the waterfall features 124a, 124b can be specifically tuned to produce the sounds 128, including having certain profiles (height, width, and so on) that are calibrated to produce a sound, including possible therapeutic sounds.

The sounds 128 can generally enhance the ambient environment 101. As shown in the example of FIG. 1, the indoor environment 100 can have a variety of objects, often decorative, that can be commonly found indoors. Sample objects include artwork 102 and decorative objects 104. The artwork 102 and decorative objects 104 can be arranged in a professional setting, such as a medical or law office, a hospitality setting, including a hotel, or other residential or commercial location. The portable indoor hydroponic garden system 110 can appropriately be arranged in such setting, and the sounds 128 can be used to enhance it. For example, any of a variety of settings can benefit from the tranquility of running water and the knowledge that such is contained in a safe and substantially leak proof environment, such as the enclosure 114.

The sounds 128 can have certain characteristics that are tuned to enhancing the ambient environment 101, including exhibiting a certain volume, melody, cadence or other property. For example, the sounds 128 can have a reduced and directionally-directed volume based at least partially on the construction of the enclosure 114. This can allow the sounds 128 to be muffled to a soothing or therapeutic level. In this regard, the sounds 128 can have a volume sufficient to allow an observer in the ambient environment 101 not wake from being asleep, while still enjoying the sounds 128 while awake. The melody and cadence of the sounds 128 can also be enhanced to potentially therapeutic levels using the structures described herein. As one example, the sounds 128 can be tailored to emit from the enclosure 114 at a frequency determined to be relaxing, pleasurable, and/or otherwise enhancing to both well-being and environment.

In addition to audial enhancement, the portable indoor hydroponic garden system 110 can also include specific structural components to visually enhance the indoor environment 100. For example, the enclosure 114 can include an opening 116, such as that shown in FIG. 1. The opening 116 can be substantially large enough so that an observer within the ambient environment 101 can maintain visual contact with the hydroponic plants 120, associated trays of the tiered growing assembly 118, and waterfall features 124a, 124b. The enclosure 114, along with the tiered growing assembly 118, can also be calibrated to visually obscure electrical and mechanical components of the portable indoor hydroponic garden system 110, helping provide a visual enhancement to the ambient environment 101. For example, and as descried in greater detail below, the portable indoor hydroponic garden system 110 can include a hydroponic fluid circulation system 190 (shown in phantom in FIG. 1). The hydroponic fluid circulation system 190 can generally be used to circulate fluid from a lowermost portion of the portable indoor hydroponic garden system 110 to an uppermost portion of the portable indoor hydroponic garden system 110, such as that associated with the tray 132a. While used to circulate water, the electrical and mechanical components of the hydroponic fluid circulation system 190 can detract from the ambient environment 101. In this regard, the opening 116 is arranged to only be large enough for viewing of the tiered growing assembly 118, and thus allowing the enclosure 114, such as panels of the enclosure 114, to visually obscure the hydroponic fluid circulation system 190. In other embodiments, the opening 116 can be one of a group of openings, including openings disposed on multiple different sides of the enclosure 114 and allowing for viewing of the tiered growing assembly 118 from multiple vantage points within the ambient environment 101.

The enclosure 114 can also enhance the ambient environment 101 with specific materials and arrangement into the configuration shown in FIG. 1. As one non-limiting example, the enclosure 114 can be constructed from a group of panels formed from a wood material. Sample materials include sanded plywood, oak, and/or other materials, including wood materials of various stains and textures. The wood materials can have a structural strength necessary to form the enclosure shape (such as the parallelepiped shape of FIG. 1) and hold the tiered growing assembly 118 therein. The wood material can also provide a visual appeal and tactile effect for the ambient environment 101. It will be appreciated, however, that in other cases other materials can be used to form the enclosure 114, including certain metals, plastics, and composites.

While a variety of dimensions and shapes are possible, the portable indoor hydroponic garden system 110 can have a width, a depth, and a height suitable for arrangement of the portable indoor hydroponic garden system 110 in the indoor environment 100. As shown in FIG. 1, the portable indoor hydroponic garden system 110 can generally be arranged on a floor of the indoor environment 100, however, in some cases, the portable indoor hydroponic garden system 110 can be placed on a platform or other slightly raised structure. In one embodiment, the portable indoor hydroponic garden system 100 can have a width of around 3 feet, a depth of around 2 feet, and a height of around 6 feet, for example, such as having a width of 3 feet 1½ inches, a depth of 2 feet 4 inches, and a height of 6 feet 8 inches. In other cases the portable indoor hydroponic garden system 100 can having a width of more or less than 3 feet, such as having a width of 2 feet 1½ inches, a width of 4 feet 1½ inches, and/or other appropriate width. In some cases, the depth and the height of the portable indoor garden system 100 can be adapted correspondingly, such as being more or less than 2 feet or 6 feet, respectively, based on the width. In other cases, other dimensions can be appropriate, including dimension having different relationships than those described herein, which may be based on a type of shape defined by the portable indoor hydroponic garden system 110.

Figure 2:
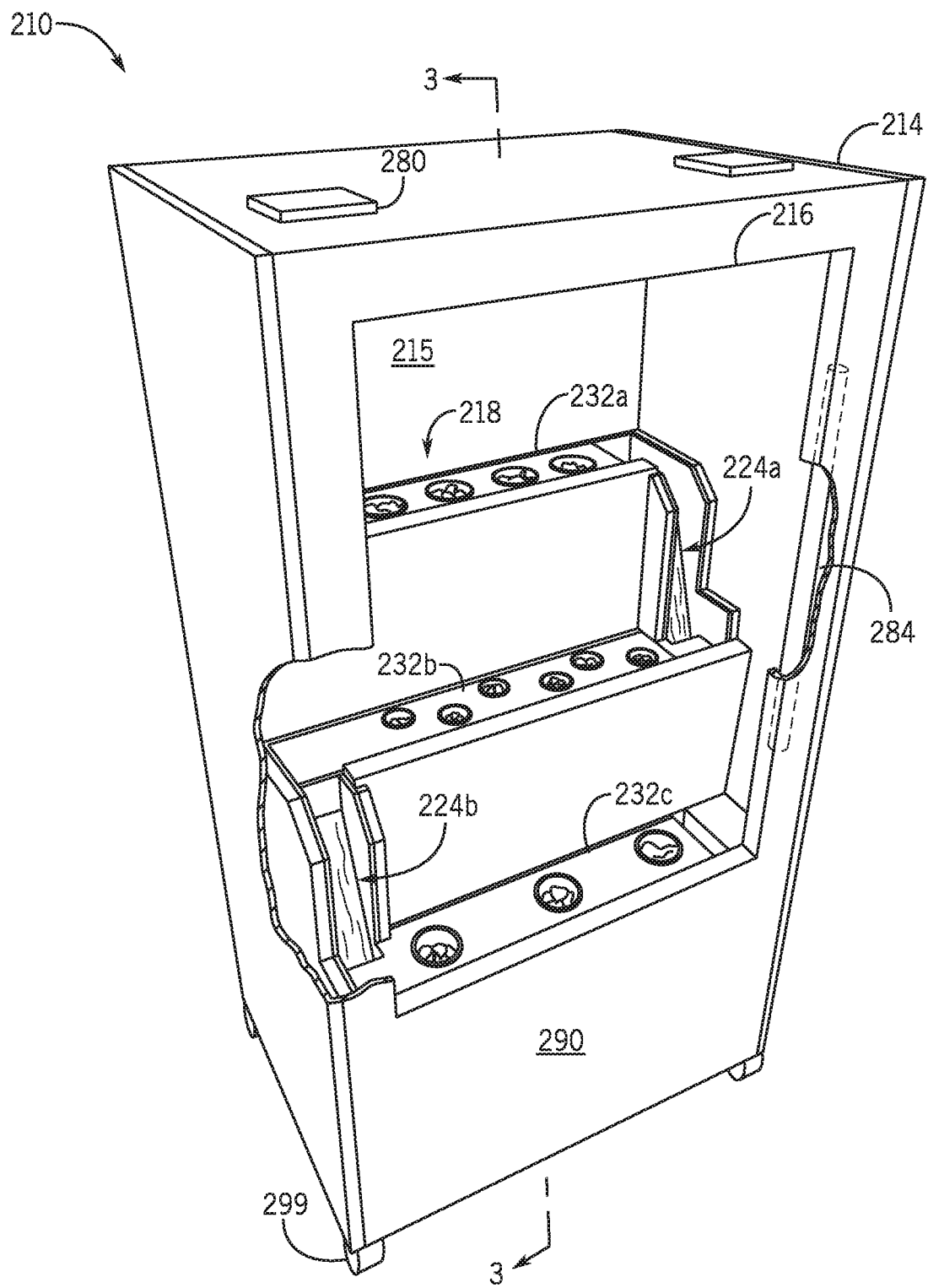
FIG. 2 depicts a cutaway view of another embodiment of a hydroponic garden system.

Turning to FIG. 2, another embodiment of a portable indoor hydroponic garden assembly is shown; a portable indoor hydroponic garden system 210. The portable indoor hydroponic garden system 210 can be substantially analogous to the portable indoor hydroponic garden system 110 described above in relation to FIG. 1. For example, the portable indoor hydroponic garden system 210 can be configured for hydroponically growing plants and enhancing an indoor environment, such as through sounds, sights, and so on. In this regard, the portable indoor hydroponic garden system 210 includes an enclosure 214, an opening 216, hydroponic plants 220, a first tray 232a, a second tray 232b, a third tray 232c, a first waterfall feature 224a, a second waterfall feature 224b, and a hydroponic fluid circulation system 290; each of which can be substantially analogous to corresponding components from the portable indoor hydroponic garden system 110 of FIG. 1.

FIG. 2 further shows the tiered growing system 210 arranged within an interior volume 215 that is defined by the enclosure 214. The interior volume 215 can substantially include the entire volume of the enclosure 214 and/or the interior volume 215 can be a subset thereof. The interior volume 215 is often divided into one or more climate controlled zones, such as a zone suited and tuned for growing the hydroponic plants 220. For example, as shown in FIG. 2, the tiered growing assembly 218 can substantially divide the interior volume 215 and define a climate-controlled region adjacent the opening 216. The climate controlled region, as described herein, can be a temperature- or light-controlled region of the interior volume 215 for growing the hydroponic plants 220, whereas other regions of the interior volume 215 may not necessarily have such light or temperature control.

In the sample of FIG. 2, the portable indoor hydroponic garden system 210 is shown including lights 284 and a fan 280 to facilitate climate control of the interior volume 215. The lights 284 and the fan 280 can define or be components of a light system and air circulation system, respectively. For example, an output of each of the lights 284 and the fan 280 can be individually controllable to produce a desired climate within the internal volume 215. The desired climate can, for example, be tuned to facilitate growing of a particular variety of plants. For example, the lights 284 can turn on and off based on the lighting needs of a variety of plants. The lights 284 can also provide heat as-needed, such as including a grow lamp function, which can provide radiant energy to facilitate plant growth. The fan 280 can cool the plants as required. Each of the lights 284 and the fan 280 can also therefore be adjusted based on the conditions of the ambient environment within which the portable indoor hydroponic garden system 210 is arranged, cooling, heating, and lighting in response to temperature and lighting conditions in the ambient environment. The responsiveness to the ambient environment can allow the portable indoor hydroponic garden system 210 to be situated in a variety of settings, despite the ambient conditions, and encourage plant growth.

Placeable in a variety of settings, the portable indoor hydroponic garden system 210 also includes wheels 299. The wheels can be caster-type wheels or other articulable motion mechanisms that facilitate movement of the portable indoor hydroponic garden system 210 from different locations. For example, a user may desire to move the portable indoor hydroponic garden system 210 from one portion of a room to another, and the wheels 299 allow for such flexibility. The wheels 299 can also help with transport of the portable indoor hydroponic garden system 210, such as by facilitating movement of the portable indoor hydroponic garden system 210 into a van or other storage and/or transportation means.

Figure 3:
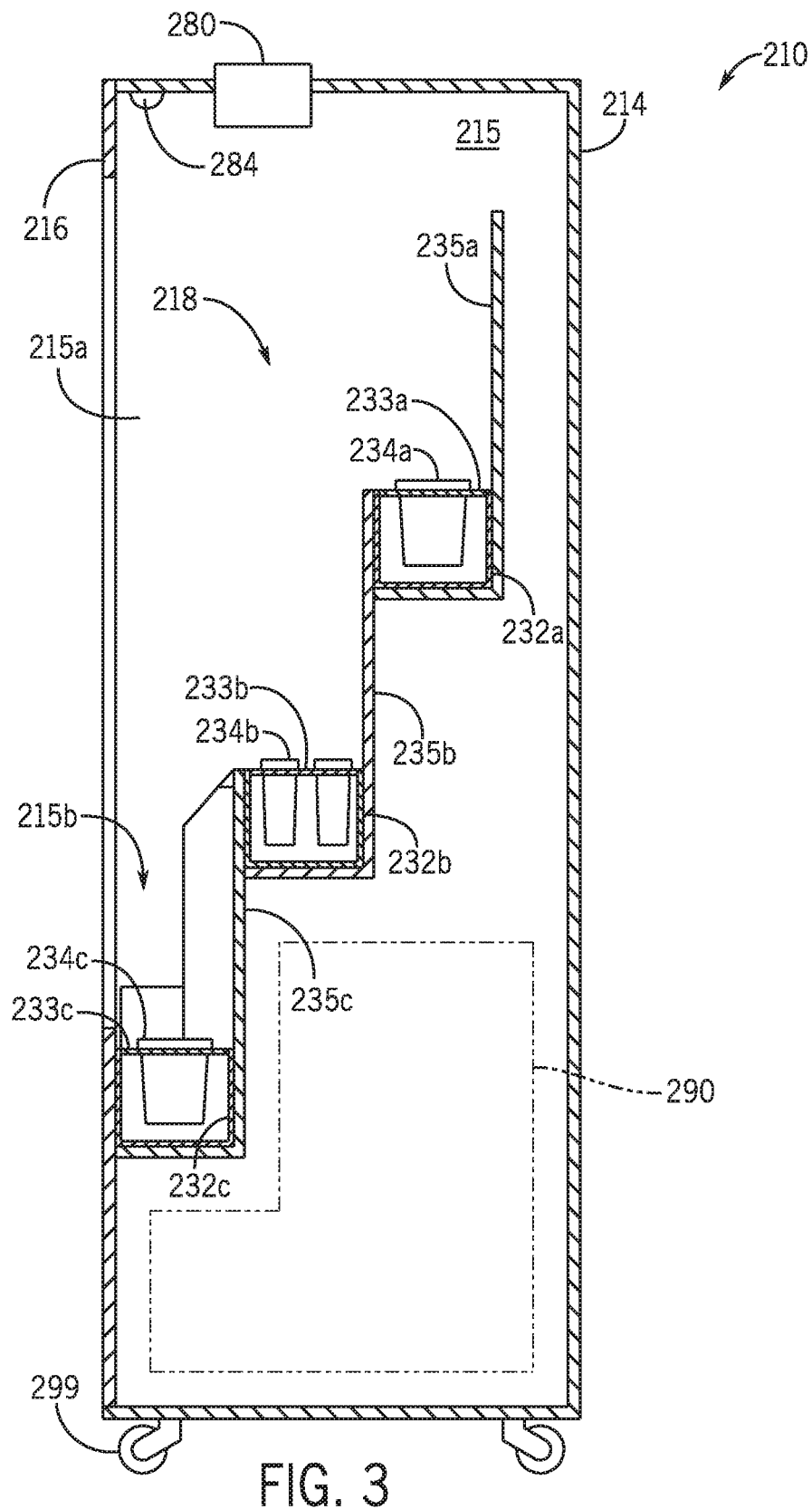
FIG. 3 depicts a cross-sectional view of the hydroponic garden system of FIG. 2, taken along line 3-3 of FIG. 2.

With reference to FIG. 3, a cross-sectional view of the portable indoor hydroponic garden system 210 of FIG. 2 is shown, taken along line 3-3 of FIG. 2. The cross-sectional view of FIG. 3 helps illustrate elevation differences of the tiered growing assembly 218 and various example constructions thereof.

Broadly, the tiered growing assembly 218 is show housed fully within the enclosure 214, such as being fully within the interior volume 215. This allows the enclosure 214 to support the tiered growing assembly 218 related to the opening 216, facilitating viewing of the hydroponically grown plants held therein. Being housed fully within the enclosure 214 also allows the enclosure 214 to catch and/or retain any stay or excess fluid emitted from the tiered growing assembly 218 during use. This can be beneficial for an indoor setting where stray fluid may cause damage to the ambient environment or otherwise may not readily evaporate, as may be the case in an outdoor setting.

As shown in FIG. 3, the tiered growing assembly 218 can be arranged to have trays at multiple elevations. For example, the first tray 232a can generally be arranged at an upper portion 215a of the interior volume 215. The first tray 232a can also generally be recessed or offset furthest from the opening 216, as compared with any of trays of the tiered growing assembly 118. The second tray 232b is shown in FIG. 3 as being elevationally below the first tray 232a and closer to the opening 216 than the first tray 232a. Further, the third tray 232c is shown in FIG. 3 as being elevationally below the second tray 232b and closer to the opening 216 than the second tray 232b. The sequentially lower elevations of the first, second, and third trays 232a, 232b, 232c allows the tiered growing assembly 218 to define a gravity-based flow of hydroponic fluid generally from the upper portion 215a to a lower portion 215b of the interior volume 215. For example, while not shown in FIG. 3 for the interest of clarity, waterfall features may generally extend from the first tray 232a to the second tray 232b, and from the second tray 232b to the third tray 232c, allowing fluid flow generally from the upper portion 215a to the lower portion 215b.

Also shown in FIG. 3 are various sample constructions of the trays of the tiered growing assembly 218. As explained in greater detail below with respect to FIG. 4, individual trays can define a trough-type shape, being a channel through which fluid can flow and interact with the root system of plants submerged therein. In this regard, FIG. 3 shows the trays as having generally angular-shaped cross-sections; however, this is not required. In other cases, the trays can include semi-circular cross-sections (e.g., a "half-pipe" shape) and/or other shapes tailored for routing fluid.

The trays 232a, 232b, 232c can be supported within the tiered growing assembly 218 in a variety of manners. FIG. 3 shows the trays being supported by a series of L-shaped support members, such as the first support member 235a, second support member 235b, and third support member 235c. Each of the support members 235a, 235b, 235c can be attached to one another and help form the tier or rows along which respective trays are arranged. The collection of support members 235a, 235b, 235c can visually obscure electrical and/or mechanical components of the portable indoor hydroponic garden system 210, such as the hydroponic fluid circulation system 290, shown in phantom in FIG. 3. In other cases, the collection of support members 235a, 235b, 235c can be clear, light transmissive, and/or be tailored to allow viewing from the opening 216 substantially into or through the enclosure 214, such as into a portion of the enclosure 214 housing the hydroponic fluid circulation system 290.

FIG. 3 also shows the tiered growing assembly 218 including covers for each respective tray. With return reference to FIG. 2, the covers can define discrete locations for hydroponic plants within each tray and help to secure or stabilize the plants during circulation of the hydroponic fluid. In this regard, FIGS. 2 and 3 show a first cover 233a, a second cover 233b, and a third cover 233c. The covers 233a, 233b, 233c can be arranged to define openings or have other features for holding hydroponic plants at discrete locations. As shown in the example of FIG. 3, the covers 233a, 233b, 233c can be arranged for holding hydroponic plant support structures 234a, 234b, 234c, such as those which can be used to hold hydroponic plants. It will be appreciated, however, that such covers are optional, and embodiments are contemplated herein including one or more or no covers as may be appropriate for a given application.

Figure 4:
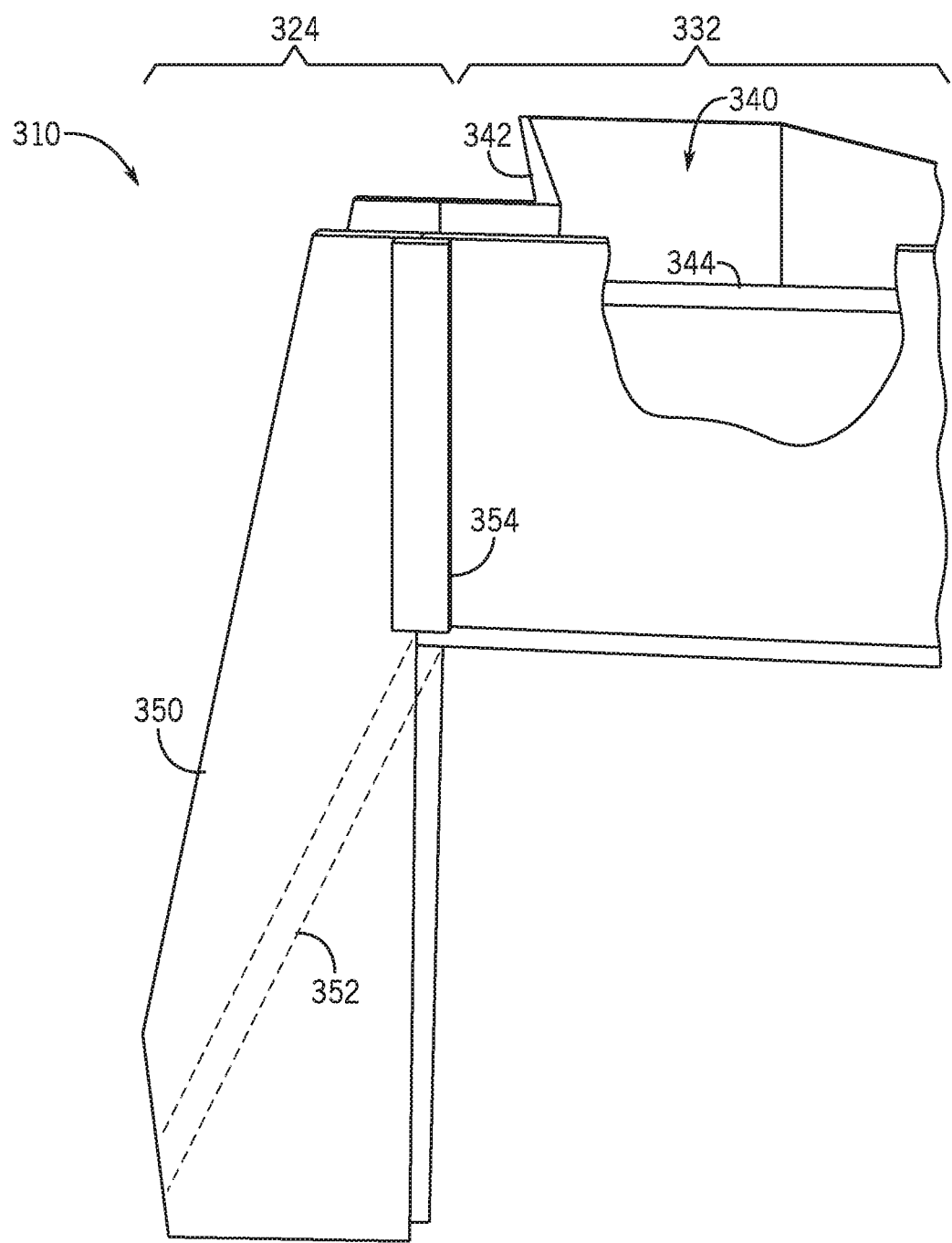
FIG. 4 depicts a sample tray and associated waterfall feature of a tiered growing assembly.

As described above, the tiered growing assembly 218 can be formed using a series of panels, such as PVC sheet-cut panels or the like to form the various troughs and waterfall features disclosed herein. With reference to FIG. 4 an illustrative detail view of a portable indoor hydroponic garden systems 310 is shown, according to various embodiments. The portable indoor hydroponic garden systems 310 can be substantially analogous to the portable indoor hydroponic garden systems 110, 210 described with respect to FIGS. 1-3, redundant explanation of which is omitted here for clarity.

In the detail of FIG. 4, the portable indoor hydroponic garden systems 310 is shown as having a tray region 332 and a waterfall region 324. The tray region 332 can include or be one of the trays described herein, such as the first, second, or third trays 132a, 132b, 132 of FIG. 1 and/or the first, second, third trays 232a, 232b, 232c of FIGS. 2-3. Further, the waterfall region 324 can include or be one of the waterfall features described herein, such as the first or second waterfall features 124a, 124b and/or the first or second waterfall features 224a, 224b.

One or both of the tray regions 332 or the waterfall region 324 can be formed from a group of panels or walls. As shown in the example of FIG. 4, the tray region 332 can be substantially formed from a group of tray walls 342. The group of tray walls 342 can cooperate to form or define a trough 340. The trough 340 can define a flow path for hydroponic fluid through the portable indoor hydroponic garden systems 310. The trough 340 may have a depth and a width to accommodate root systems of plants of various types, thereby allowing the roots systems of hydroponic plants to extend into the trough for submerging into the stream of fluid traveling along the hydroponic flow path. In some cases, the tray region 332 can also include a barrier insert 344. The barrier insert can define a blockage or partial blockage along the flow path defined by the trough 340. This can be beneficial to pool fluid along the tray at a region associated with a particular hydroponic plant. Particularly in the event temporarily ceasing fluid flow, the barrier insert 344 can retain at least some water in the trough 340 at the placement of a hydroponic plant, helping to provide the plant with nutrients even in the absence of flow.

Water or other hydroponic fluid can generally progress from the tray region 332 to the waterfall region 324. At the waterfall region 324 fluid can be allowed to transition from a substantially stable flow of the tray region 332 to a cascade-type flow at the waterfall region 324, which transfers fluid to the next elevation at a tray or catch arranged below. Although the waterfall region 324 need not necessarily have any walls or features (e.g., the fluid could fall without obstruction from a first tray to a second tray below), the waterfall region 324 of FIG. 4 is shown having waterfall walls 350. The waterfall walls 350 can generally guide the fluid from the tray region 332 and into a managed stream or cascade toward a tray below. The waterfall walls 350 can thus help mitigate unnecessary splashing or other effects that could generate stray water and exit from the portable indoor hydroponic garden systems 310.

Additionally, the waterfall region 324 can include an angled panel 352, as shown in FIG. 4. The angled panel 352 can, with the waterfall walls 350, guide fluid from the tray region 332 and form a cascade. The angled panel 352 can thus be arranged at any appropriate angle of attack to produce a desired shape of the water cascading from one tray to the next. The angle of attack of the angled panel 352 can therefore help tune the sound emitted from cascading water, with high pitched angles inducing sounds different from lower pitched arrangements.

FIG. 4 shows the tray region 332 and the waterfall region 324 mated to one another. In particular, the tray region 332 and the waterfall region 324 are joined to one another using a waterproof interface 354. The waterproof interface 354 can include sheet-cut PVC or other materials which form an overlap with each of the walls of the tray region 332 and the waterfall region 324, thereby mitigating leakage between each region. Additionally or alternatively, adhesives, epoxies, and/or other sealants can be used to mitigate water leakage between the tray region 332 and the waterfall region 324. In yet other cases, the tray region 332 and the waterfall region 324 can be formed as a single, integrally-formed component having substantially no transition, thereby reducing or eliminating avenues for leakage between each region.

Figure 5:
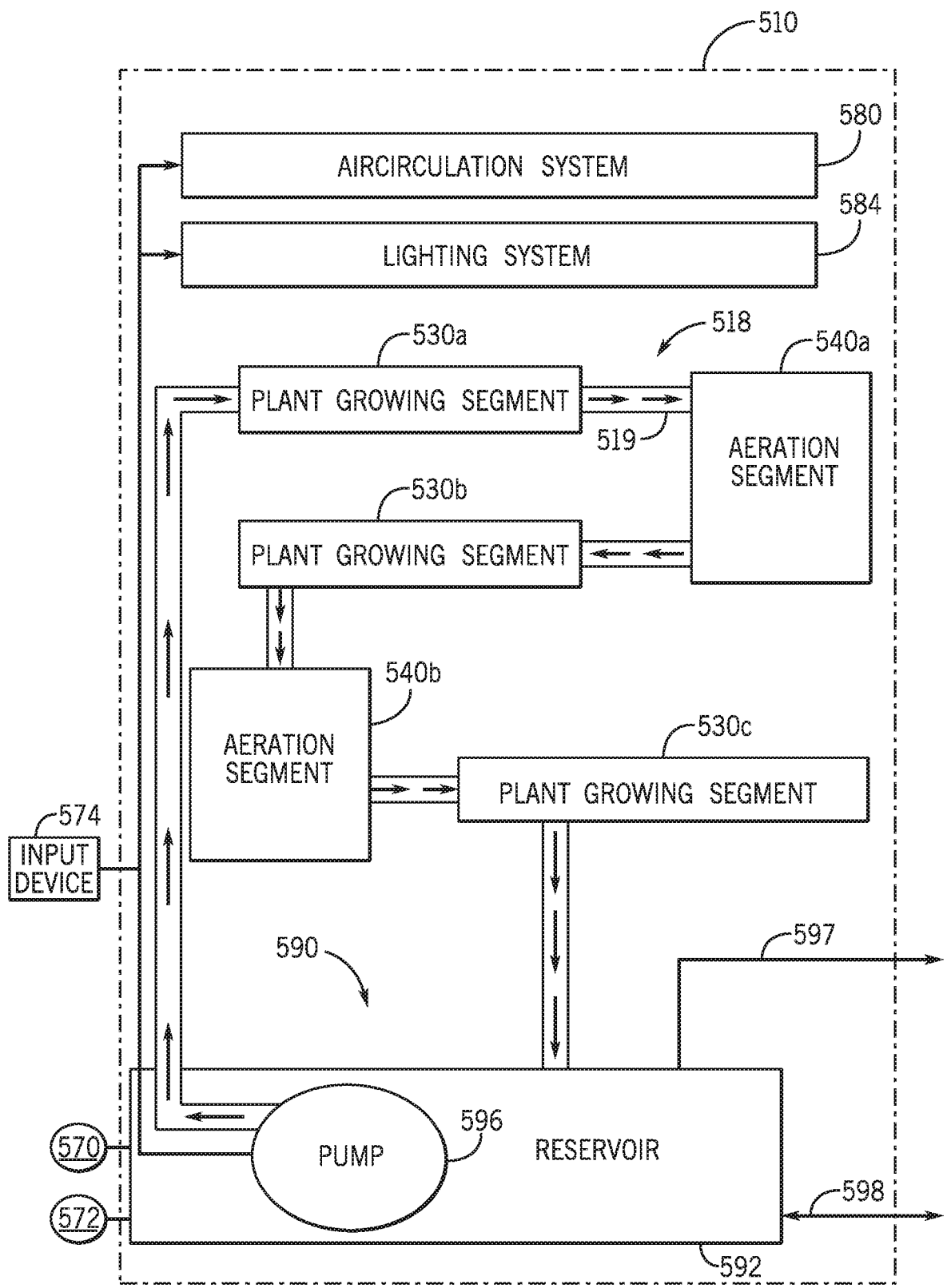
FIG. 5 depicts a functional diagram of a hydroponic garden system.

Turning to FIG. 5, a functional diagram of a portable indoor hydroponic garden system 510 is shown. The portable indoor hydroponic garden system 510 can be substantially analogous to the portable indoor hydroponic garden systems 110, 210, 310 described herein; redundant explanation of which is omitted here for clarity.

Notwithstanding the foregoing, FIG. 5 shows functional components of the portable indoor hydroponic garden system 510, including illustrative flow paths of hydroponic fluid, electrical systems, and so on. For example, FIG. 5 shows a tiered growing assembly 518 defines a hydroponic flow path 519. The hydroponic flow path 519 can generally define a fluid path through which water or other hydroponic fluid circulates to help provide nutrients for plant growth. The hydroponic flow path 519 is generally indicated in FIG. 5 by piping, including arrows showing a configuration in which fluid is generally flowing along the hydroponic flow path 519.

The hydroponic flow path 519 generally includes or defines a number of fluidic elements that support hydroponic plant growth and enhancement of the ambient indoor environment. In the example of FIG. 5, the hydroponic flow path 519 includes or is associated with a first plant growing segment 530a, a second plant growing segment 530b, and a third plant growing segment 530c. Each of the plant growing segments can correspond to a region of the tiered growing assembly 518 within which hydroponic plants are grown. In one embodiment, the plant growing segments can substantially correspond to trays, such as the trays 132a, 132b, 132c shown with reference to FIG. 1; however, this not required. Other configurations and embodiments are contemplated herein in which other structures are used to support growth of the hydroponic plants identified by the first, second, and/or third plant growing segments 530a, 530b, 530c of FIG. 5.

The hydroponic flow path 519 also includes aeration segments arranged fluidically between the respective plant growing segments. The aeration segments can agitate fluid or otherwise cause oxygen and other helpful gasses to enter the fluid. In the embodiment of FIG. 5, the tiered growing assembly 518 includes at least a first aeration segment 540a and a second aeration segment 540b. In one embodiment, the aeration segments can substantially correspond to the waterfall features described herein, such as the waterfall features 124a, 124b shown with reference to FIG. 1; however, this is not required. Other configurations and embodiments are contemplated herein in which other structures are used to support growth gasses introduction into the hydroponic fluid.

The tiered growing assembly 518 is also associated with or includes components for circulating fluid along the hydroponic flow path 519. In the embodiment of FIG. 5, a reservoir 592 and a pump 596 are shown. The reservoir 592 and the pump 596 can form components of a hydroponic fluid circulation system 590. The reservoir 592 can be a tub, basin, or other fluid holding structure that provides for storage of fluid used in circulating along the hydroponic flow path 519. The reservoir 590 can have a volume that is sufficiently large enough to contain all fluid in the hydroponic flow path 519, and thus allow for cessation of fluid flow without overfilling and spillage into surrounding components. The pump 596 can be a submerged pump arranged with the reservoir. The pump 596 generally operates to establish hydraulic head that allows fluid to flow to an uppermost portion of the portable indoor hydroponic garden system 510. For example, the first plant growing segments 530a can be arranged at an uppermost portion of an enclosure. The pump 596 thus operates to establish a hydraulic head sufficient for fluid to reach at least this uppermost portion of the enclosure. Once at the first plant growing segment 530a, fluid flow can be largely gravity-based, flowing from the first plant growing segment 530a to the third plant growing segment 530c without encouragement from the pump 596. From the third plant growing segment 530c, fluid may fall into the reservoir 592, whereat the fluid can pool and be stored for subsequent recirculation along the hydroponic flow path 519 using the pump 596.

As described in greater detailer below, the tiered growing assembly 518, and the portable indoor hydroponic garden system 510 more generally, can also include various other fluidic connections. In the example functional diagram of FIG. 5, a drain path 597 is shown. The drain path 597 can define an avenue for emptying fluid from the reservoir 592. In some cases, the drain path 597 can be a gravity-based drain, such as by removing fluid from the reservoir using a stopper, plug, or other mechanical device that causes release of water from the reservoir 592 when removed. In other cases, the drain path 597 can be associated with a pump (including being associated with the pump 596) to actively remove fluid from the reservoir 592. Also shown in FIG. 5, is a tie-in path 598. The tie-in path 598 can generally be representative of a fluidic connection between the reservoir 592 and another fluidic system that can be external to the portable indoor hydroponic garden system 510. For example, the reservoir 592 can be connected to another portable indoor hydroponic garden system using the tie-path 598. As another example, the tie-path 598 can provide a connection to other nutrients, helping to replenish water in the reservoir with infused or additive ingredients that can foster plant growth.

Associated with the reservoir 592 can also be an indicator 570 and a sensor 572. The indicator 570 can generally be used as a visual indication of a characteristic of the reservoir 592. For example, the indicator 570 can provide a visual indication of a level of fluid in the reservoir 592. As such, the indicator 570 need not necessarily be electrically powered or activated. For example, in some cases, the indicator 570 can include a light-transmissive window formed along a side an enclosure and in optical communication with the reservoir 592. The sensor 572 can include any of a variety of electromechanical devices that facilitate operation of the hydroponic fluid circulation system 590. Similar to the indicator 570, the sensor 572 can too be used to detect a level of fluid in reservoir, including using various level gauge techniques. In other cases, the sensor 575 can be a more generic sensing structure that detects one or more characteristics including temperature, flow rate, nutrient content, pH, and/or other properties of fluid in the hydroponic fluid circulation system 190 that could be relevant for hydroponic plant growth.

The portable indoor hydroponic garden system 510 can also include various other electrical and mechanical components, some of which are represented functionally in the diagram of FIG. 5. For example and as described herein, the portable indoor hydroponic garden system 510 includes a climate-controlled region helpful for growing hydroponic plants. The climate-controlled region can include systems and components for regulating both temperature and light in certain embodiments. In this regard, FIG. 5 shows the portable indoor hydroponic garden system 510 having an air circulation system 580 and a lighting system 584. The air circulation system 580 can be operable to control and regulate a temperature within which hydroponic plants are grown. For example, the air circulation system 580 can be integrated with the tiered growing assembly 518 in a manner to set a particular temperature and maintain the temperature for plants arranged in one or more of the first, second, and/or third plant growing segments 530a, 530b, 530c of FIG. 5. In this regard, the air circulation system 580 can include or be the fan 280 of FIG. 2. In other embodiments, the air circulation system 580 can include other components, such as a humidifier, a heater, or a chilling device, among other components.

The lighting system 584 generally operates to control and maintain lighting conditions within, and emitted from, the portable indoor hydroponic garden system 510. For example, the lighting system 584 can be integrated with the tiered growing assembly 518 in a manner to set a particular lighting and maintain the lighting for plants arranged in one or more of the first, second, and/or third plant growing segments 530a, 530b, 530c of FIG. 5. In this regard, the lighting system 584 can include the lights 284 of FIG. 2. In other embodiments, the lighting system 584 can include other components, including other variations of lights and/or configuration which facilitate hydroponic plant growth. In this regard, the lighting system 584 can also include lights that are outwardly directed, and/or tailored to facilitating emitting light into an ambient environment within which the portable indoor hydroponic garden assembly is arranged.

An output of each of the air circulation system 580, the lighting system 584, and the hydroponic fluid circulation system 590 can be controlled by a user. In this regard, FIG. 5 shows each of such system interconnected by an input device 574. The input device 574 can generally be any variety of switch or panel configured to receive user input for controlling one or more functions of the portable indoor hydroponic garden system 510. For example, in some embodiments, the input device 574 can include a touch screen associated with a controller and computer processor. The touch screen can generally detect user input associated with the one or more functions of the portable indoor hydroponic garden system 510 and the controller, including the processor, and analyze the input and cause the system 510 to perform the associated function. Such function can include controlling the climate within the portable indoor hydroponic garden system 510 using the air circulation system and/or the lighting system 584, as described herein. Other functions include controlling operation of the hydroponic fluid circulation system 590, including programming certain run cycles or periods during which fluid is circulated along the hydroponic flow path 519. In other cases, other functions are contemplated, including combinative functions or sequences in which the air circulation system 580, the lighting system 584, and/or the fluid circulation system 590 are operated together to facilitate hydroponic plant growth and enhancement of the ambient environment.

Figure 7:
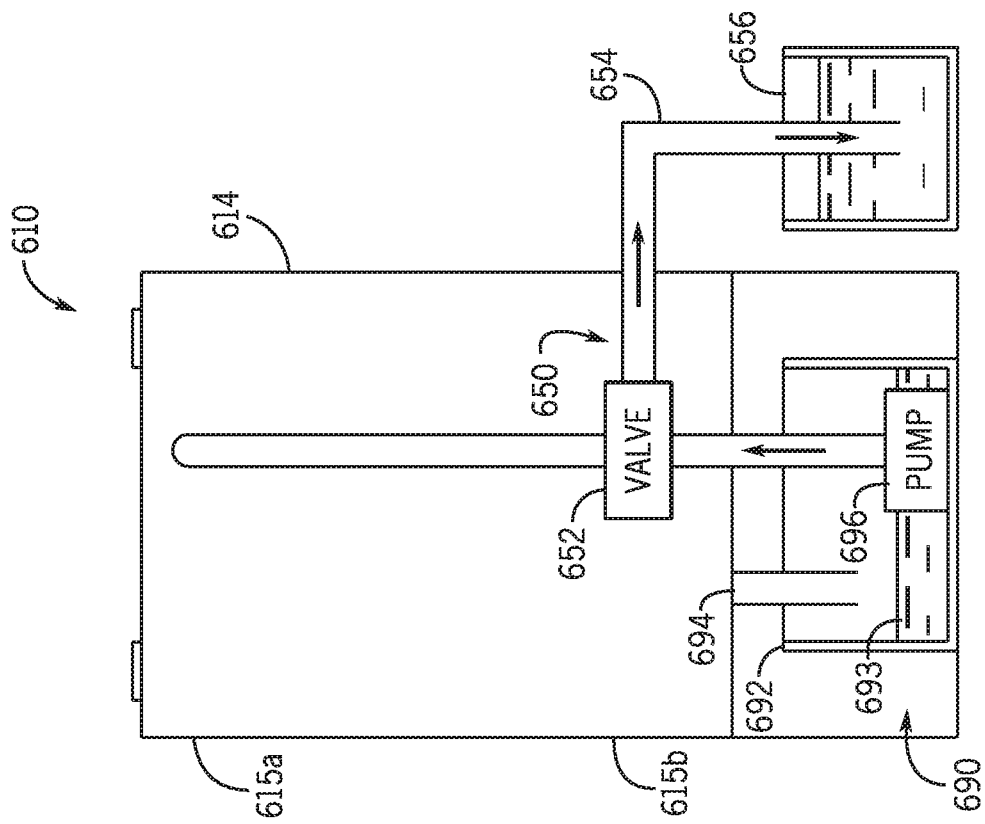
FIG. 7 depicts a rear schematic view of the hydroponic garden system of FIG. 7 in a second configuration.
Figure 6:
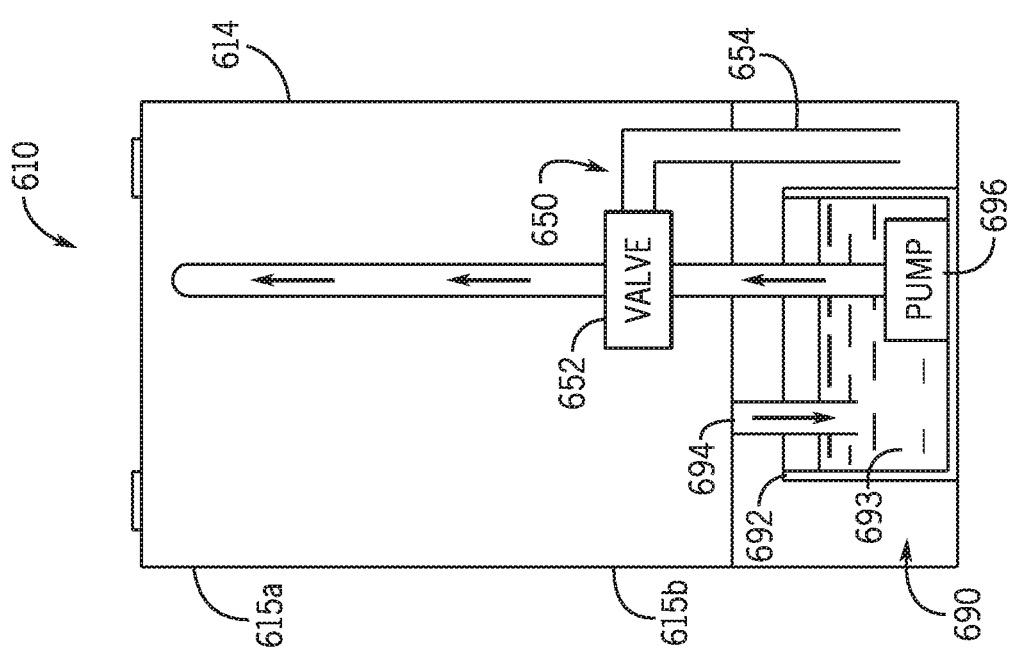
FIG. 6 depicts a rear schematic view of a hydroponic garden system in a first configuration.

FIGS. 6 and 7 show another example of a portable indoor hydroponic garden system, the portable indoor hydroponic garden system 610. The portable indoor hydroponic garden system 610 can be substantially analogous to the various portable indoor hydroponic garden systems described herein, including the portable indoor portable hydroponic gardens systems 110, 210, 310, 510, and variations and combinations thereof, redundant explanation of which is omitted herein for clarity. FIGS. 6 and 7 show rear schematic views of the portable indoor hydroponic garden system 610 in various configurations. In particular, the rear schematic views of FIGS. 6 and 7 show operation of a hydroponic fluid circulation system 690. In a first configuration, the hydroponic fluid circulation system can operate to circulate fluid through the portable indoor hydroponic garden system 610 for plant growth. In a second configuration, the portable indoor hydroponic garden system 610 can operate to circulate fluid out of the portable indoor hydroponic garden system 610 to drain the system of fluid.

With reference to FIG. 6, the portable indoor hydroponic garden system 610 is shown in a first configuration in which the hydroponic fluid circulation system 690 is used to circulate a hydroponic fluid 693. Similar to the hydroponic fluid circulation systems described herein, the hydroponic fluid circulation system 690 can include at least a reservoir 692 and a pump 696. As shown in the first configuration of FIG. 6, the pump 696 can operate to cause flow the hydroponic fluid 693 generally from a lower region 615b of an enclosure 614 to an upper region 615a of the enclosure 614, indicated by flow arrows in FIG. 6. Once at the upper region 615a, the hydroponic fluid 693 can progress along a hydroponic flow path including hydroponically grown plants (not shown in FIGS. 6 and 7 in the interest of clarity). Flow through the hydroponic plants can generally process as a gravity-based flow from the upper region 615a and toward the lower region 615b. At the lower region 615b, the fluid may return to the hydroponic fluid circulation system 690 at a catch 694, shown in FIG. 6. For example, the catch 694 can be a pipe, channel, basin, gutter, or other mechanism operative to collect the hydroponic fluid 693 and direct the hydroponic fluid 693 to the reservoir 693 for subsequent recirculation through the system.

The hydroponic fluid circulation system 690 can also include a drain subsystem 650. The drain subsystem 650 generally operates to remove the hydroponic fluid 693 from the reservoir 692. While many components and arrangements are possible, the configuration of FIGS. 6 and 7 show the drain subsystem 650 as including a valve 652 and a hose 654. The valve 652 can be a flow control element arranged substantially in-line with the pump 696 and the upper region 615a of the enclosure 614. In the configuration of FIG. 6, the valve 652 can be manipulated into substantially preventing flow of the hydroponic fluid 693 to the hose 654, while allowing the hydroponic fluid 693 to progress from the pump 696 to the upper region 615a.

With reference to FIG. 7, the valve 652 can be further manipulated in order to use the pump 696 to drain the hydroponic fluid 693 from the reservoir 692. As shown in FIG. 7, when further manipulated, the valve 652 can generally block the hydroponic fluid 693 from reaching the upper region 615a, and rather, direct the hydroponic fluid 693 into the hose 654. In this configuration, the pump 696 can generate hydraulic head that causes movement and flow of the hydroponic fluid out of the portable indoor hydroponic garden system 610. In some cases, the flow out of the portable indoor hydroponic garden system 610 can be toward and into a receptacle 656, shown in FIG. 7. This can allow for removal of the hydroponic fluid 693 without disassembling the portable indoor hydroponic garden system 610 and/or removing the reservoir 692. While the receptacle 656 is shown for purposes of illustration, in other cases the hose 654 can be attached or used to empty the hydroponic fluid 693 to other external containers, bins, drains, and so on.

For example, in another embodiment, the hose 654 can be routed toward and substantially into the reservoir 692. This can occur when the valve 652 is generally in a configuration in which flow of hydroponic fluid 693 is substantially prevented from reaching the upper portion 615a. In this regard, the hose 654 can be used to recirculate the hydroponic fluid 693 back into the reservoir 692. This can be beneficial, for example, when adding nutrients or other additives to the hydroponic fluid 693, encouraging mixing with the recirculation providing by the hose 654.

Figure 8:
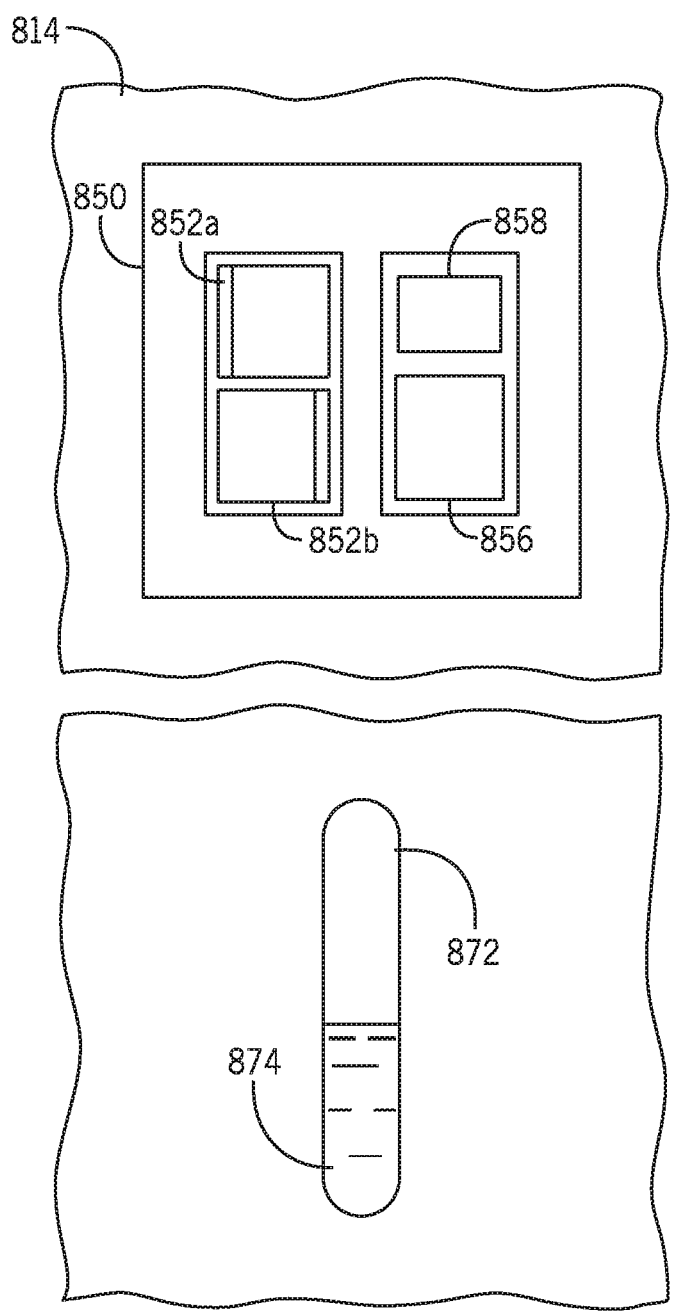
FIG. 8 depicts an illustrative side panel of a hydroponic garden system.

As described herein, the various portable indoor hydroponic garden systems, assemblies, apparatus, and so forth can include a variety of controls, indicators, sensors, switches, and the like to control operations facilitating hydroponic plant growth and/or environment-enhancement of an ambient environment. FIG. 8 depicts a portion of an enclosure 814 having an example implementation of such features. The enclosure 814 can be an enclosure for any of the portable indoor hydroponic garden systems described above, including the portable indoor hydroponic garden systems 110, 210, 310, 510, 610, and any combination or variation thereof, redundant explanation of which is omitted here for clarity.

In the example of FIG. 8, the enclosure 814 is shown as including an input device 850. The input device 850 can be integrated with a side panel of the enclosure 814, as shown in FIG. 8, however, in other cases, the input device 850 can be a remote communication device or other system that is communicatively coupled with the portable indoor hydroponic garden assembly. The input device 850, as described herein with respect to FIG. 6, can be used to control climate control functions of the portable indoor hydroponic garden system, including controlling heat and light conditions for the hydroponically-grown plants. In this manner, the input device 850 shown in FIG. 8 includes a first switch 852a and a second switch 852b. In one embodiment, the first switch 852a can be actuated in order to cause lighting systems of the portable indoor hydroponic garden system to emit light toward the hydroponically-grown plants. Further, the second switch 852b can be actuated in order to cause air circulation systems of the portable indoor hydroponic garden system to emit and circulate air, including heated and/or cooled air, toward the hydroponically-grown plants. In other cases, the first and second switches 852a, 852b can perform other functions, including causing other heating and lighting outputs within the portable indoor hydroponic garden system. In this manner, it will be appreciated that the first and second switches 852a, 852b are shown in FIG. 8 as representations, and that in other embodiments, more or fewer switches can be implemented as appropriate for a given application.

The input device 850 can also include other components to facilitate user input, as well as to provide visual indications and outputs to the user of particular components. In this regard, FIG. 8 shows an example status indicator 858. The status indicator 858 can be an illuminable button or other device that indicates to a user one or more operational statuses of the portable indoor hydroponic garden system, such as when one or more of the pump, the fan, the lights, and/or other components are operational, malfunctioning, require services, and so on. The status indicator 858 can also be used to detect input, such as being used to activate one or more other components of the portable indoor hydroponic garden system and/or be used as a master power-down switch, among other functions.

FIG. 8 also shows the input device 850 including an optional touch screen 856. The touch screen 856, in certain embodiments, can display any of a variety of symbols, icons, controls, and so on that can be indicative of an input functionality of the touch screen 856. For example, the touch screen 856 can display information associated with programming one or more of the fluid circulation system, air circulation system, the light system, and so on. As such, a user can use the touch screen 856 to selectively time the operation of one or more of these systems. This can be beneficial in an indoor environment, for example, where such systems are programmable with respect to particular requirements of the setting, such as being configured to run such components during commercial business hours, as may be the case where the portable indoor hydroponic garden system is arranged in a professional setting, such as a medical or law office.

While the controls and functions of the input device 850 are largely electrically activated or electrically powered-type controls, the enclosure 814 can also have mechanical or passive-type controls. In this regard, FIG. 8 also shows the enclosure including an indicator 872. The indicator 872 can be a window or other light-transmissive portion of the enclosure that is in optical communication with the reservoir held therein. In this regard, a user can view a level of a hydroponic fluid 874 by viewing the reservoir through the window defined by the indicator 872. In some cases a light or other device can be arranged within the portable indoor hydroponic garden system in order to illuminate the reservoir at a portion aligned with the indicator.

Figure 9:
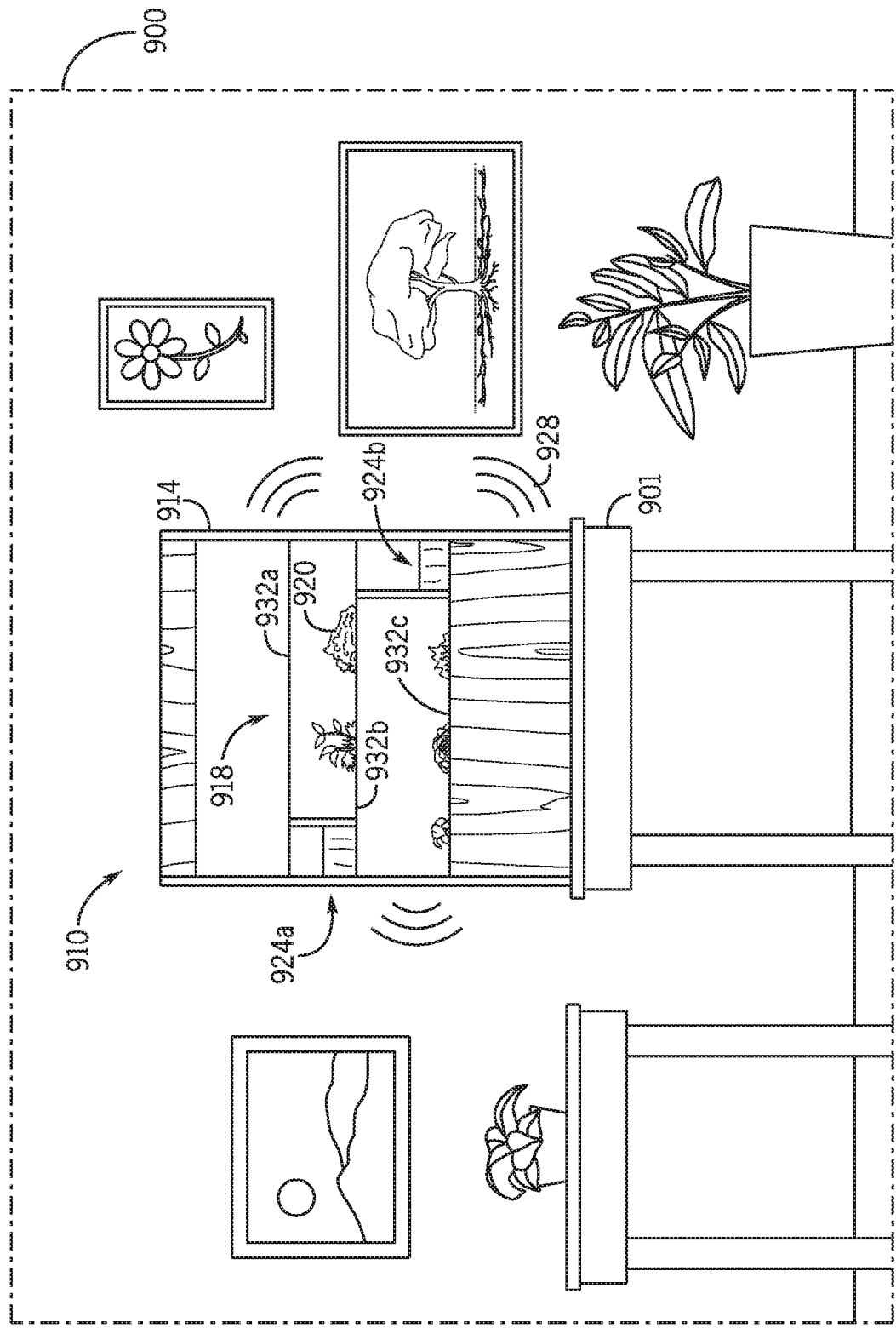
FIG. 9 depicts another embodiment of a hydroponic garden system.

FIG. 9 depicts another embodiment of a hydroponic garden system, a portable indoor hydroponic garden system 910. The portable indoor hydroponic garden system 910 can be substantially analogous to the various portable indoor hydroponic garden systems described herein, including the portable indoor hydroponic gardens systems 110, 210, 310, 510, 610, and variations and combinations thereof, redundant explanation of which is omitted herein for clarity.

Notwithstanding the foregoing, the portable indoor hydroponic garden system 910 can be configured for placement on a tabletop, a counter, or shelf. For example, FIG. 9 shows the portable indoor hydroponic garden system 910 arranged on a table 901. The table 901 can be an end table, dining table, or other platform that is raised above a ground or floor of a room. In this regard, the table 901 can have a top surface that is one, two, three, four, or more feet above a ground position of a room 900 in which the portable indoor hydroponic garden system 910 is arranged. Given this and the size of the table 901 defining an often small or confined area (such as being less than a dozen square feet), the portable indoor hydroponic garden system 910 can be physically smaller than the other portable indoor hydroponic garden assemblies described herein. Sample dimensions of the portable indoor hydroponic garden system 910 include having the enclosure 914 with a width of around 2 feet, a depth of around 1 foot, and a height of around 3 feet, for example, such as having a width of 1 foot 9⅝ inches, a depth of 1 foot 1½ inches, and a height of 2 feet 4 inches. In some cases, the width, the depth, and/or or the height of the portable indoor garden system 910 can be more or less, as appropriate for arrangement of the portable indoor garden system 910 on a table top or other raised surface.

In light of the foregoing, all elements of the portable indoor hydroponic garden system 910 can be arranged above a ground or floor level elevation of the indoor environment 900. For example and as shown in FIG. 9, the portable indoor hydroponic garden system 910 can having a tiered growing assembly 918 arranged fully within the enclosure 914 that is positioned on and supported by the table 901. Substantially analogous to other tiered growing assemblies described herein, the tiered growing system 910 can be arranged to grow hydroponic plants 920. As such, the tiered growing system 910 can include a first, second, and third trays 932a, 932b, 932c that are interposed by first and second waterfall features 924a, 924b. The first and second waterfall features 924a, 924b can emit sounds 928 into the indoor environment 900, and as shown in FIG. 9, being arranged and supported by the table 901, the waterfall features 924a, 924b can emit sounds 928 at different, often higher elevations within the indoor environment 900, as compared with being arranged at a floor elevation. Further, the reduced size of the portable indoor hydroponic garden system 910 can allow for greater portability and handling, allowing a user to move the portable indoor hydroponic garden system 910 between different locations, including different indoor settings, without disassembly of the portable indoor hydroponic garden system 910.

Figure 10:
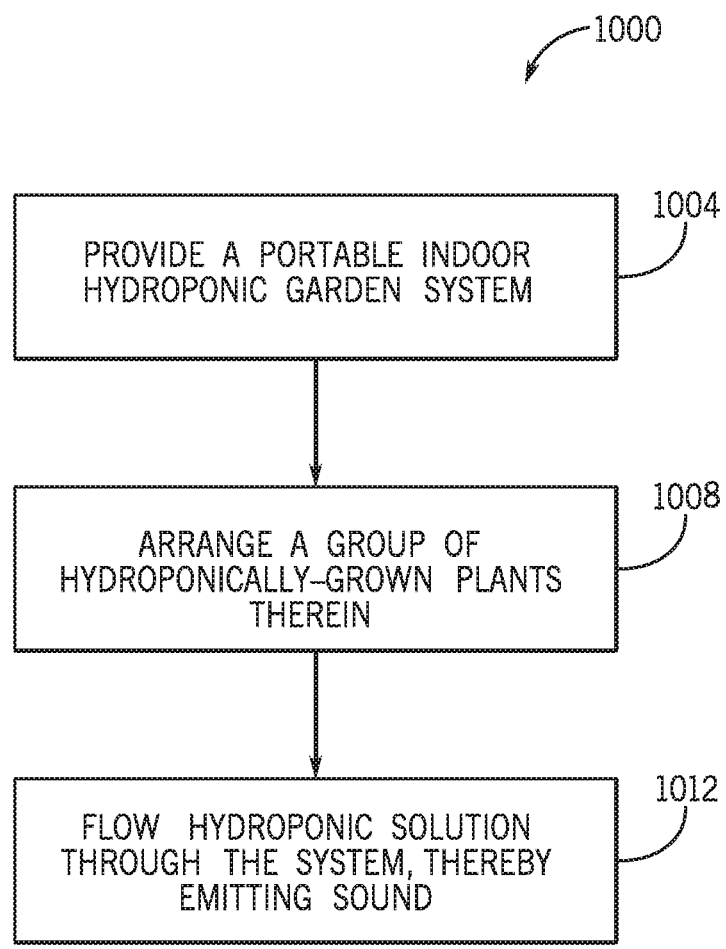
FIG. 10 depicts a flow diagram for operating a hydroponic garden system.

To facilitate the reader's understanding of the various functionalities of the embodiments discussed herein, reference is now made to the flow diagram in FIG. 10, which illustrates process 1000. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 10, process 1000 relates generally to a method for operating a portable indoor hydroponic garden system. The process can be used with any of the hydroponic garden systems, assemblies, apparatuses, and so on described herein, for example, such as the portable indoor hydroponic garden systems 110, 210, 310, 510, 610, and/or 910, and variations or combinations thereof.

At operation 1004, a portable indoor hydroponic garden system is provided. For example and with reference to FIG. 1, the portable indoor hydroponic garden 110 can be provided. As explained more fully in the above description of FIG. 1, the portable indoor hydroponic garden 110 can have the tiered growing assembly 118 housed fully within the enclosure 118. The tiered growing assembly 118 can be viewable from one or more positions in the ambient environment 101 using the opening 116 arranged in the enclosure 114. The tiered growing assembly 118 can take many forms, including having at least the first tray 132a and the second tray 132b. Between the first tray 132a and the second tray 132b is a waterfall feature 124a. In other cases, other variations of the portable indoor hydroponic garden can be provided, including providing at operation 1004 a system having move trays, waterfall features, and/or different configurations of enclosure (such as an enclosure having different openings) than that shown in the configuration of FIG. 1.

At operation 1008, a group of hydroponically-grown plants is arranged in a first or second tray of a growing assembly. For example and with reference to FIG. 1, hydroponic plants 120 can be arranged within the portable indoor hydroponic garden 110. In particular, at least some of the hydroponic plants 120 can be arranged within either one or both of the first tray 132a and/or the second tray 132b. As described herein, the trays 132a, 132b can be suited for growing hydroponic plants, defining a trough for the root system of such plants and an avenue or channel to flow substantially through the root system to encourage plant growth.

At operation 1012, hydroponic fluid is flowed along a hydroponic flow path using a circulation system. This can produce a pleasurable or therapeutic sound for release into an indoor environment. For example, and with reference to FIGS. 1 and 5, water can flow through the various trays of the tiered growing system 110 using the circulation system 190. For example, one or more pumps can induce fluid flow to the first tray 132a which can be an uppermost tray of the tiered growing assembly 118. Once at the first tray 132a, the fluid can continue through the tiered growing assembly as defined by a gravity-based flow, moving from the first tray 132a to the second tray 132b and defining the waterfall feature 124a therebetween. The waterfall feature 124a can be calibrated to emit the sounds 128 into the ambient environment 101. In some cases, the sound 128 can enhance the ambient environment, providing a soothing audial enhancement to the ambient environment often associated with natural waterfalls or other natural features not found indoors.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A portable indoor hydroponic garden system, comprising:
an enclosure having an interior volume and an opening extending into the interior volume, the interior volume defining a climate-controlled zone arranged at the opening and configured to regulate light, temperature, or humidity therein;

a tiered growing assembly housed fully within the enclosure, the tiered growing assembly comprising:

a first tray for containing hydroponically-grown plants arranged at an upper portion of the climate-controlled zone and defining a first plant-growing segment of a hydroponic flow path, wherein the first tray comprises a plurality of first panels forming a first trough and defining an outlet of the first trough in one sidewall of the first trough, the outlet extending from a floor of the first trough to an upper edge of the first trough;

a waterfall feature extending from the first tray and defining an aeration segment of the hydroponic flow path that cascades from the first segment, wherein the waterfall feature comprises an angled panel fitted in the outlet of the first trough and having a free end extending angularly away from the floor of the first trough; and a second tray for containing hydroponically-grown plants arranged elevationally below the first tray and closer to the opening than the first tray, the second tray defining a second plant-growing segment of the hydroponic flow path that receives cascading flow from the aeration segment, wherein the second tray comprises a plurality of second panels forming a second trough having an open top side, and wherein the free end of the angled panel is positioned at least partially in the second trough extending therein at the open top side of the second trough, wherein the first plant-growing segment, the aeration segment, and the second plant-growing segment are consecutive sequential segments of the hydroponic flow path; and a hydroponic fluid circulation system housed fully within the enclosure and configured to cause hydroponic fluid circulation along the hydroponic flow path;

wherein the waterfall feature is configured to emit a sound when hydroponic fluid flows along the aeration segment of the hydroponic flow path;

wherein the opening is configured to permit release of the sound to an ambient environment and viewing of the first plant-growing segment, the aeration segment, and the second plant growing segment of the hydroponic flow path from the ambient environment; and wherein the tiered growing assembly is configured to visually obscure the hydroponic fluid circulation system.

2. The system of claim 1, wherein:
the waterfall feature is a first waterfall feature;
the aeration segment is a first aeration segment;
the tiered growing assembly further comprises:
a second waterfall feature extending from the second tray and defining a second aeration segment of the hydroponic flow path that cascades from the second segment; and
a third tray for containing hydroponically-grown plants and arranged elevationally below the second tray and closer to the opening than the second tray, the third tray defining a third plant-growing segment of the hydroponic flow path that receives cascading flow from the second aeration segment; and
the first plant-growing segment, the first aeration segment, the second plant-growing segment, the second aeration segment, and the third plant-growing segment are consecutive sequential segments of the hydroponic flow path.

3. The system of claim 2, wherein:
flow of hydroponic fluid from the first plant-growing segment, to the first aeration segment, to the second plant-growing segment, to the second aeration segment, and to the third plant-growing segment is a gravity-based flow; and
the hydroponic fluid circulation system comprises:
a reservoir arranged at a lower portion of the enclosure and separated from the opening by the tiered growing assembly, the reservoir configured to hold a quantity of the hydroponic fluid for circulation along the hydroponic flow path;
a pump configured to draw the hydroponic fluid held within the reservoir to the first plant-growing segment of the hydroponic flow path; and
a catch configured to route the hydroponic fluid from the third-plant growing segment to the reservoir.

4. The system of claim 3, wherein:
the enclosure includes a viewing window arranged at the lower portion and adjacent the reservoir; and
the viewing window is configured to convey information associated with the hydroponic fluid held within the reservoir, including a fill level and fluid quality.

5. The system of claim 3, wherein the hydroponic fluid circulation system further comprises a drain subsystem, the drain subsystem configured to use the pump for exit of the hydroponic fluid to an exterior receptacle.

6. The system of claim 3, further comprising a lighting system housed fully within the enclosure and configured to optically enhance the climate-controlled zone with respect to a viewing position outside the enclosure and optically aligned with the opening, a portion of the lighting system being visually obscured from the ambient environment by one or more walls of the enclosure.

7. The system of claim 6, further comprising a group of wheels, the group of wheels supporting the enclosure within the exterior environment configured to permit movement of the enclosure from a first location to a second location.

8. The system of claim 6, wherein the enclosure is configured for placement on a tabletop, counter, or shelf.

9. The system of claim 6, further comprising an air circulation system housed fully within the enclosure and configured to remove heat from the climate-controlled zone through the opening, one or more of the pump, the lighting system, or a fan controllable by a timer arranged along a side of the enclosure.

10. The system of claim 1, wherein the enclosure is formed from a wood material.

11. The system of claim 10, wherein the enclosure defines a parallelepiped, the opening of the enclosure being arranged at a face of the parallelepiped such that a border of the enclosure obscures electromechanical components of the system from view through the opening.

12. The system of claim 1, wherein the plurality of first panels are formed from a plastic material and joined to one another at waterproof interfaces, thereby forming the first trough.

13. The system of claim 12, further comprising a reinforcement layer connected to adjacent panels forming the first trough along the waterproof interface.

14. The system of claim 1, further comprising a barrier insert positionable within the first trough, the barrier insert spanning a width of the first trough along a bottommost portion of the hydroponic flow path of the first plant growing segments.

15. The system of claim 1, further comprising a cover arranged over the first trough and having a series of openings configured to receive plants for hydroponic growth.

16. The system of claim 1, further comprising:
   the hydroponic fluid, the hydroponic fluid being a blend of water and hydroponic nutrients; and
   a group of hydroponically-grown plants.

17. A method for operating a portable indoor hydroponic garden system, comprising:
   providing a portable indoor hydroponic garden system, the portable indoor hydroponic garden system comprising:
   an enclosure having an interior volume and an opening extending into the interior volume, the interior volume defining a climate-controlled zone arranged at the opening and configured to regulate light, temperature, or humidity therein;
   a tiered growing assembly housed fully within the enclosure, the tiered growing assembly comprising:
   a first tray for containing hydroponically-grown plants arranged at an upper portion of the climate-controlled zone and defining a first plant-growing segment of a hydroponic flow path, wherein the first tray comprises a plurality of first panels forming a first trough and defining an outlet of the first trough in one sidewall of the first trough, the outlet extending from a floor of the first trough to an upper edge of the first trough;
   a waterfall feature extending from the first tray and defining an aeration segment of the hydroponic flow path that cascades from the first segment, wherein the waterfall feature comprises an angled panel fitted in the outlet of the first trough and having a free end extending angularly away from the floor of the first trough; and
   a second tray for containing hydroponically-grown plants arranged elevationally below the first tray and closer to the opening than the first tray, the second tray defining a second plant-growing segment of the hydroponic flow path that receives cascading flow from the aeration segment, wherein the second tray comprises a plurality of second panels forming a second trough having an open top side, and wherein the free end of the angled panel is positioned at least partially in the second trough extending therein at the open top side of the second trough, wherein the first plant-growing segment, the aeration segment, and the second plant-growing segment are consecutive sequential segments of the hydroponic flow path; and
   a hydroponic fluid circulation system housed fully within the enclosure and configured to cause hydroponic fluid circulation along the hydroponic flow path;
   wherein the waterfall feature is configured to emit a sound when hydroponic fluid flows along the aeration segment of the hydroponic flow path;
   wherein the opening is configured to permit release of the sound to an ambient environment and viewing of the first plant-growing segment, the aeration segment, and the second plant growing segment of the hydroponic flow path from the ambient environment; and
   wherein the tiered growing assembly is configured to visually obscure the hydroponic fluid circulation system;
   arranging a group of hydroponically-grown plants in the first or second tray; and
   flowing hydroponic solution along the hydroponic flow path using the hydroponic fluid circulation system, thereby emitting the sound from the waterfall feature to the ambient environment through the opening.

18. The method of claim 17, further comprising emitting light toward the group of hydroponically-grown plants.

* * * * *